United States Patent
Feng et al.

(10) Patent No.: US 12,548,436 B2
(45) Date of Patent: Feb. 10, 2026

(54) TRAFFIC INFORMATION QUANTIZATION METHOD IN THE INTELLIGENT NETWORK ENVIRONMENT AND ITS SYSTEM

(71) Applicants: Hefei University of Technology, Hefei (CN); Hefei Urban Planning and Design Institute, Hefei (CN); Intelligent Manufacturing Institute of HFUT, Hefei (CN)

(72) Inventors: Zhongxiang Feng, Hefei (CN); Li Dai, Hefei (CN); Yubing Zheng, Hefei (CN); Congjun Huang, Hefei (CN); Shisheng Fang, Hefei (CN); Xu Jiang, Hefei (CN); Zongzu Liu, Hefei (CN); Yinbin Shen, Hefei (CN); Weihua Zhang, Hefei (CN); Jingyu Li, Hefei (CN); Dianchen Zhu, Hefei (CN)

(73) Assignees: Hefei University of Technology, Hefei (CN); Hefei Urban Planning and Design Institute, Hefei (CN); Intelligent Manufacturing Institute of HFUT, Hefei (CN)

( * ) Notice: Subject to any disclaimer, the term of this patent is extended or adjusted under 35 U.S.C. 154(b) by 159 days.

(21) Appl. No.: 18/200,626

(22) Filed: May 23, 2023

(65) Prior Publication Data

US 2024/0062649 A1 Feb. 22, 2024

(30) Foreign Application Priority Data

Aug. 19, 2022 (CN) .......................... 202210995518.8

(51) Int. Cl.
G08G 1/01 (2006.01)

(52) U.S. Cl.
CPC ......... *G08G 1/0125* (2013.01); *G08G 1/0112* (2013.01)

(58) Field of Classification Search
CPC .. G08G 1/0125; G08G 1/0112; G08G 1/0133; G08G 1/0141; G08G 1/0967;
(Continued)

(56) References Cited

U.S. PATENT DOCUMENTS

| 2019/0036952 A1* | 1/2019 | Sim ...................... G06V 10/764 |
| 2022/0161822 A1* | 5/2022 | Fonseca ............... G05D 1/0088 |

FOREIGN PATENT DOCUMENTS

| CN | 112818853 A | 5/2021 |
| CN | 113434483 A | 9/2021 |

(Continued)

OTHER PUBLICATIONS

Zheng Qiumei, et al., Research on Traffic Sign Recognition Based on Improved ResNet Network, Computer & Digital Engineering, 2021, pp. 947-951, 965, vol. 49, No. 5.
(Continued)

*Primary Examiner* — Davetta W Goins
*Assistant Examiner* — Sharmin Akhter

(57) ABSTRACT

A traffic information quantization method in an intelligent network environment includes: step S1: extracting traffic information sources according to collected videos and classifying the traffic information sources; step S2: obtaining a state set and a probability distribution of each traffic information source through actual observation and calculation; step S3: using information theory to quantify the traffic information sources. Further, a traffic information quantization system in the intelligent network environment is provided, and the traffic information quantization method in the intelligent network environment and its system are adopted to quantify the driving information of the driving process
(Continued)

and calculate the amount of information. The method and system can transform uncertain information into certain information, improve driving efficiency, help drivers optimize the driving process, and ensure driving safety.

1 Claim, 3 Drawing Sheets

(58) Field of Classification Search
CPC ...... G06V 10/454; G06V 10/82; G06V 20/40; G06V 20/58; G06V 20/582; G06V 20/584; G06V 20/588; G06V 2201/07; Y02T 10/40
See application file for complete search history.

(56) References Cited

FOREIGN PATENT DOCUMENTS

| CN | 113808011 A | 12/2021 |
|---|---|---|
| CN | 114008685 A | 2/2022 |

OTHER PUBLICATIONS

Zhang Wei, Information Cognition Calculation Model of Traffic Sign Based on Information Entropy, Transport Research, 2015, pp. 56-65, vol. 1, No. 4.

\* cited by examiner

TRAFFIC INFORMATION QUANTIZATION METHOD IN THE INTELLIGENT NETWORK ENVIRONMENT AND ITS SYSTEM

CROSS REFERENCE TO THE RELATED APPLICATIONS

This application is based upon and claims priority to Chinese Patent Application No. 202210995518.8, filed on Aug. 19, 2022, the entire contents of which are incorporated herein by reference.

TECHNICAL FIELD

The invention relates to the field of traffic information quantization technology, in particular to a traffic information quantization method and its system in the intelligent network environment.

BACKGROUND

As the cognitive carrier of road network environment, traffic information is transmitted to the driver in the form of voice, image, text, and symbol, which aims to eliminate the uncertainty of real-time traffic conditions during the driving process, ensure driving safety and improve travel efficiency. The driving information of the driver in the intelligent network environment includes information about people, vehicles, roads, and the environment, however, it can be divided into information within the visual range and information outside the visual range from the perspective of the driver's information perception and processing characteristics, that is, 'the visible information' and 'the invisible information'. 'The visible information' is the visual information that can be observed directly, while 'the invisible information' includes occluded information, long-distance information, and auditory information.

In the intelligent network environment, various traffic information can be collected by vehicle equipment and provided to the driver. But the concept of traffic information itself is abstract, we need to quantify the information. As early as 1948, Shannon pointed out in his famous paper 'Mathematical Principles of Communication': 'Information is something that is used to eliminate random uncertainties', and proposed the concept of 'information entropy' (borrowing the concept of entropy in thermodynamics) to solve the problem of information measurement.

Most of the existing technologies only calculate the amount of information of transportation infrastructure and do not specifically calculate the amount of information of the driving scene.

SUMMARY

The purpose of the invention is to provide a traffic information quantization method and its system in the intelligent network environment, quantify the driving information during the driving process, calculate the amount of information, and convert uncertain information into certain information, it improves the driving efficiency, helps drivers optimize the driving process, and ensures driving safety.

In order to achieve the above purpose, the invention provides a traffic information quantization method in the intelligent network environment. The specific steps are as follows:

step S1: extracting traffic information sources according to collected videos and classifying the traffic information sources;

step S2: obtaining a state set and a probability distribution of each traffic information source through actual observation and calculation;

step S3: using information theory to quantify the traffic information sources.

Preferably, in step S1, the types of traffic information sources include traffic participants, vehicles, roads, and environment;

the specific steps of the classification are as follows:

step S11: capturing images in real-time and sending the captured images to a convolutional neural network model by a car camera, which includes a convolutional layer and a fully connected layer;

step S12: after the images are input into a Resnet framework, performing a Zeropad operation and using a sliding window to process the images, extracting information features of the original images by using Batch Normalization (BN) regularization operation, Relu activation function, and maximum pooling operation after the convolution layer operation;

step S13: inputting the extracted information features into two different residual blocks in series, performing Average-Pooling operation to the output of the residual block, and then performing Flatten operation to obtain advanced features;

step S14: inputting advanced features into the fully connected layer to classify the images and obtain traffic information sources for traffic participants, vehicles, roads, and background environment.

Preferably, in step S2, according to the traffic information sources obtained in step S1, obtaining the state set of each information source through actual observation, and obtaining the probability distribution by calculation;

let S be a finite state set of the information source, let $S=\{X_1, X_2, X_3, \ldots, X_m\}$, let P be a probability distribution of the finite state set S, and the probability of the state $X_i$ is $P(X_i)$.

Preferably, in step S3, the specific steps are as follows:

step S31: calculating the amount of information of a single traffic information source.

In information theory, information is output by the traffic information source, and the traffic information source is U, let $$U = f(S, P)$$

let the amount of information of the traffic information source U in the state $X_i$ be $I_{X_i}$, which is calculated follows:

$$I_U = I_{X_i} = -\log_2 P(X_i)$$

the information entropy can represent the uncertainty degree of the traffic information source, it is represented by the overall average of the information amount of all possible states; the information entropy is positively correlated with the uncertainty degree of the traffic information source, the information entropy of the traffic information source is calculated as follows:

$$H(U) = -\sum_{i=1}^{m} P(X_i) \log_2 P(X_i)$$

when the probability of information sent by each state is equal, then:

$$H(U) = \sum_{i=1}^{m} P(X_i)\log_2\left(\frac{1}{p}\right) = I_{X_i}$$

step S32: calculating the amount of information of the driving scene, the calculation formula is as follows:

$$I_n = \sum_{i=1}^{i=n} -\log_2 P(X_i)$$

among them, n is the number of traffic information sources for a driving scene;

the calculation formula of the information entropy of the driving scene is as follows:

$$B = -\sum_{i=1}^{i=n}\sum_{i=1}^{i=m} P(X_i)\log_2 P(X_i)$$

A traffic information quantization system in the intelligent network environment, including an information source extraction device, a processor, and a memory, the information source extraction device includes a camera for collecting images of driving scenes and a convolutional neural network model for extracting traffic information source recognition;

the processor is used to calculate state probability distribution and traffic information of traffic information sources;

the memory is used to store the execution program and the state set and probability distribution of each traffic information source.

Therefore, the invention adopts the traffic information quantization method and its system in the intelligent network environment with the following beneficial effects:

(1) The invention quantifies the driving information of the driving process, calculates the amount of information, it can convert uncertain information into certain information.

(2) By calculating the amount of information from a single information source to obtain the amount of information of the driving scene, the traffic information beyond the visual range can be quantified, in practical applications, it can be determined according to the size of the amount of information, which is the key information that the driver needs and then provides it to the driver, thereby improving driving efficiency, helping to optimize the driving process and ensuring driving safety.

The following is a further detailed description of the technical solution of the invention through drawings and embodiment.

DETAILED DESCRIPTION OF THE EMBODIMENTS

Embodiment

Figure 1:
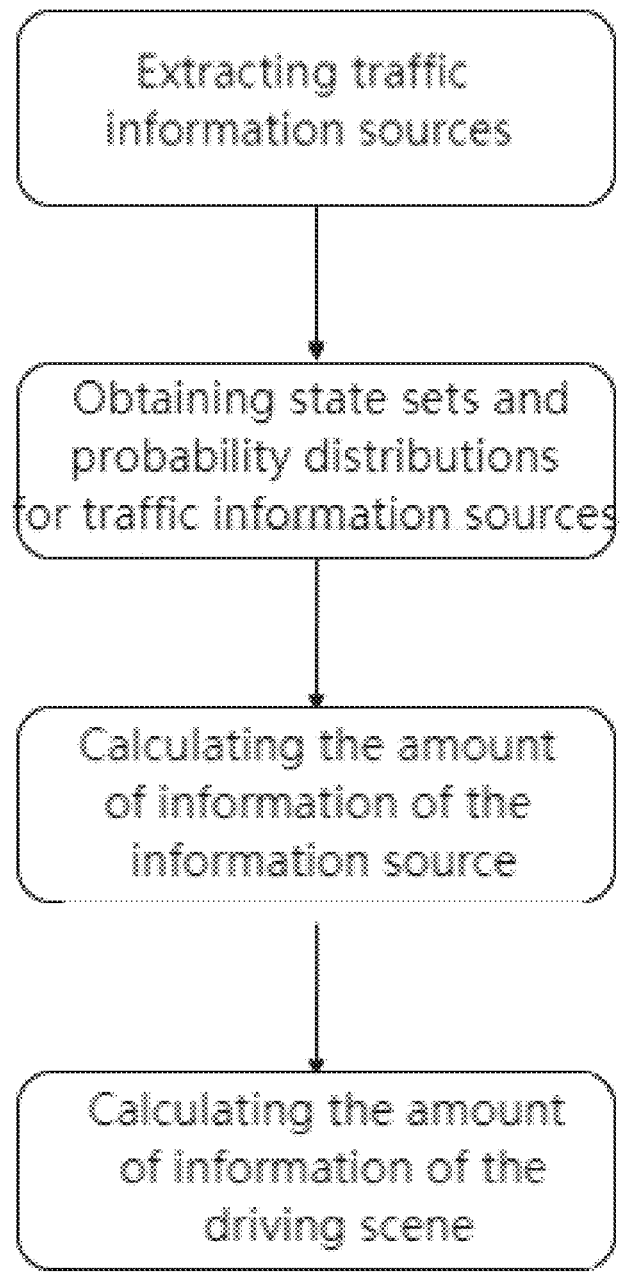
FIG. 1 is a flow chart of the traffic information quantization method in the intelligent network environment.
Figure 2:
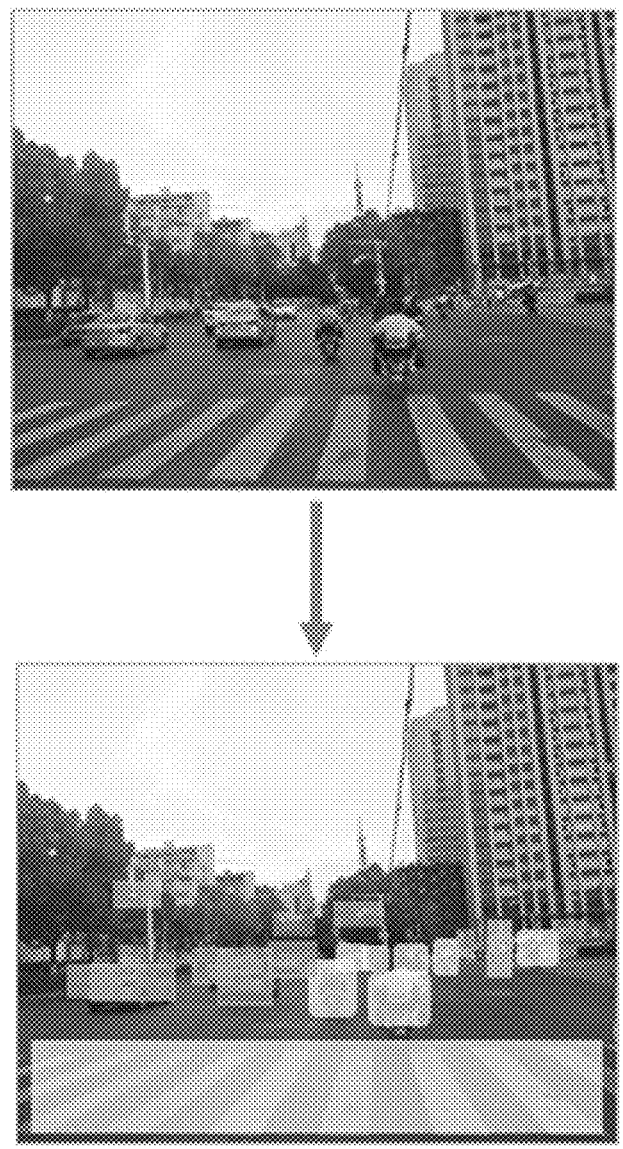
FIG. 2 is an extraction process diagram of the invention.

FIG. 1 is a flow chart of the traffic information quantization method in the intelligent network environment. As shown in FIG. 1, the traffic information quantization method in the intelligent network environment is as follows:

step S1: the traffic information sources were extracted and classified according to the collected videos. As shown in FIG. 2, the types of traffic information sources include traffic participants, vehicles, roads, and environment; traffic participants are divided into pedestrians and cyclists; vehicle refers to the vehicles in the driving scene; roads refers to the road conditions, including signal lights, traffic signs, and guardrails; the environment mainly refers to the surrounding environment of the vehicles, including management facilities and climatic conditions.

The specific steps of division are as follows:

step S11: The car camera captured images in real-time and sent the captured images to the convolutional neural network model, which includes a convolutional layer and a fully connected layer.

The convolutional neural network model (CNN) shows superiority in target detection and can find discriminant features from the original data, the knowledge of two-dimensional shape invariance is integrated by using local connection patterns and imposing constraints on weights. The weight-sharing architecture in the network greatly reduces the number of weights, and the image can be directly used as input, avoiding the complex process of feature extraction in the traditional recognition algorithms.

The mechanism of a neural network consists of two parts:

The convolutional layer is responsible for extracting image features and transforming high-level features that are beneficial to neural network classification from the original low-dimensional features.

The fully connected layer uses the advanced features obtained by the convolutional layer to classify images.

Figure 3:
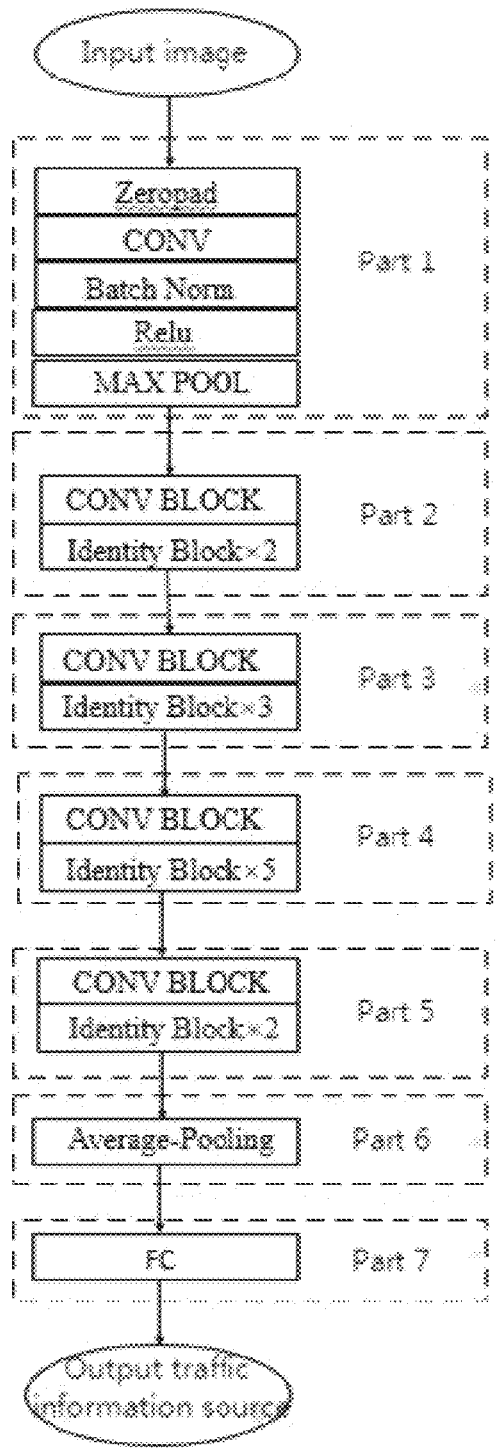
FIG. 3 is a specific implementation flow chart of ResNet50.

This method uses ResNet50 as the basic framework, and the Resnet50 network contains 49 convolutional layers and a fully connected layer, the core idea of the Resnet50 network structure is the construction of the Residual net (residual network). The data output of a certain layer of several layers in the front is directly skipped to the input part of the following data layers. It means that the content of the subsequent feature layer will be partially linearly contributed by a certain layer in the front, which improves the robustness of the model, and the ResNet50 network framework can improve computational efficiency while providing excellent computational results. In the Resnet50 network structure, the overall framework is formed by connecting two different residual blocks: CONV BLOCK and Identity Block in series, and each residual block contains three layers of convolution layer. As shown in FIG. 3, the overall network structure can be divided into seven parts. The first part does not contain residual blocks, and mainly calculates the convolution, regularization, activation function, and maximum pooling of the input. The second, third, fourth, and fifth parts all contain residual blocks, step S12: after the images were input into the Resnet framework, the Zeropad operation was performed and the sliding window was used to process the scene images, the information feature extraction of the original images was performed by BN regularization operation, Relu activation function, and maximum pooling operation;

step S13: the extracted information features were input into two different residual blocks in series, the output of the residual block was subjected to Average-Pooling operation, and then Flatten operation was performed to obtain advanced features;

step S14: advanced features were input into the fully connected layer to classify the images and obtain traffic information sources of traffic participants, vehicles, roads, and background environment;

step S2: the state set and probability distribution of each traffic information source were obtained through actual observation and calculation. According to each traffic information source obtained by step S1, the state set of each information source was obtained through actual observation, and the probability distribution was obtained by calculation. Let S be a finite state set of an information source, let S={$X_1, X_2, X_3, \ldots, X_m$}, let P be a probability distribution of the finite state set S, and the probability of state occurrence is:

some of the information sources were calculated as follows:

1, Signal Lights

According to the signal cycle set by the traffic police department, the light probabilities of red, green, and yellow lights were obtained and calculated according to the proportion of the time.

The state set of the signal lights was S={red light, green light, yellow light}; the probability distribution is P(red light)=red light duration/signal cycle, P(green light)=green light duration/signal cycle, P(yellow light)=yellow light duration/signal cycle.

2, Traffic Signs

According to 'Road traffic signs and markings' (GB5768-2022), traffic signs are mainly divided into seven categories: prohibition signs, warning signs, indication signs, guide signs, tourist area signs, notice signs, and auxiliary signs, they can be divided into two categories: guide signs and non-guide signs.

For non-guide signs, it is composed of different types of elements, which are divided into Chinese characters, letters, numbers, colors, geometric shapes, pictures, and symbols.

According to the 'general standard Chinese character table', there are 3500 commonly used Chinese characters, 26 English letters, the 10 numbers from 0-9; according to the provisions of 'Road Traffic Signs and Markings' (GB5768-2022), there are 10 colors allowed for traffic signs: red, blue, yellow/fluorescent yellow, fluorescent yellow-green, green, brown, orange/fluorescent orange, pink/fluorescent pink, black and white; there are six allowed geometric shapes: octagon, inverted equilateral triangle, circle, equilateral triangle, fork, rectangle; there are 6 kinds of arrows; there are more than 50 kinds of pictures and symbols commonly used in traffic signs.

TABLE 1

| | Composition of traffic signs | |
|---|---|---|
| Element classification | Number of the commonly used | Probability distribution |
| Chinese characters | 3500 | 1/3500 |
| Letters | 26 | 1/26 |
| Numbers | 10 | 1/10 |
| colors | 10 | 1/10 |
| geometrical shapes | 6 | 1/6 |
| arrow | 6 | 1/6 |
| Pictures and symbols | 50 | 1/50 |

For guide signs: the probability of occurrence of place names is P=1/m, and m refers to all place names in one specific place; other symbols are calculated as non-guide signs.

3, Vehicle Information

The information about other vehicles can be obtained according to GPS positioning, and the state set and probability of surrounding vehicles can be obtained.

4, Traffic Participants

Various states are equally possible, then the probability distribution is proportional, namely $P(X_i)=1/x$, among them, x is the possible state of traffic participants, such as turning left, turning right, going straight, and stopping.

5, Traffic Lines and Guardrails

The probability is calculated according to the length of the occupied road, the calculation formula is as follows:

$$P(X_i)=l_i/L$$

among them, $l_i$ is the length of traffic markings or guardrails, L is the total length of the road.

Step S3: information theory was used to quantify the traffic information sources.

The specific steps are as follows:

Step S31: the amount of information of a single traffic information source was calculated.

In information theory, information is output by the traffic information source, and the traffic information source is U, let $$U=f(S,P)$$

let the amount of information of the traffic information source U in the state $X_i$ be $I_X$, which is calculated as follows:

$$I_U=I_{X_i}=-\log_2 P(X_i)$$

the information entropy can represent the uncertainty of the traffic information source, it is represented by the overall average of the information amount of all possible states; the information entropy is positively correlated with the uncertainty of the traffic information source, the information entropy of the traffic information source is calculated as follows:

$$H(U) = -\sum_{i=1}^{m} P(X_i)\log_2 P(X_i)$$

when the probability of information sent by each state is equal, then:

$$H(U) = \sum_{i=1}^{m} P(X_i)\log_2\left(\frac{1}{p}\right) = I_{X_i}$$

step S32: the amount of information of the driving scene was calculated, the calculation formula is as follows:

$$I_n = \sum_{i=1}^{i=n} -\log_2 P(X_i)$$

among them, n is the number of traffic information sources for a driving scene;

the calculation formula of the information entropy of the driving scene is as follows:

$$B = -\sum_{i=1}^{i=n}\sum_{i=1}^{i=m} P(X_i)\log_2 P(X_i)$$

A traffic information quantization system in the intelligent network environment, including an information source extraction device, a processor, and a memory, the information source extraction device includes a camera for collecting images of driving scenes and a convolutional neural network model for extracting traffic information source recognition, according to the type of information source actually extracted, information source data can be obtained by adding or communicating with other detection equipment;

the processor is used to calculate state probability distributions and traffic information of traffic information sources;

the memory is used to store the execution program and the state set and probability distribution of each traffic information source.

Therefore, the invention adopts the above-mentioned traffic information quantization method in the intelligent network environment and its system, and the traffic information quantization method in the intelligent network environment and its system are adopted to quantify the driving information of the driving process and calculate the amount of information, it can transform uncertain information into certain information, which improves driving efficiency, helps drivers optimize the driving process, and ensures driving safety.

Finally, it should be noted that the above embodiment is only used to explain the technical solution of the invention rather than to restrict it. Although the invention is described in detail with reference to the better embodiment, ordinary technicians in this field should understand that they can still modify or replace the technical solution of the invention, and these modifications or equivalent replacements cannot make the modified technical solution out of the spirit and protection scope of the technical solution of the invention.

What is claimed is:

1. A traffic information quantization method in an intelligent network environment, comprising:

step S1: extracting traffic information sources according to collected videos and classifying the traffic information sources;

wherein in step S1, types of the traffic information sources comprise traffic participants, vehicles, roads, and a background environment;

specific steps of the classification are as follows:

step S11: capturing images in real-time and sending the images to a convolutional neural network model by a car camera, wherein the convolutional neural network model comprises a convolutional layer and a fully connected layer;

step S12: after the images are input into a Resnet framework, performing a Zeropad operation and using a sliding window to process the images, and extracting information features of the original images by using Batch Normalization (BN) regularization operation, Relu activation function, and maximum pooling operation after a convolution layer operation;

step S13: inputting the information features into two different residual blocks in series, performing Average-Pooling operation to an output of the residual block, and then performing Flatten operation to obtain advanced features; and step S14: inputting the advanced features into the fully connected layer to classify the images and obtain the traffic information sources for the traffic participants, the vehicles, the roads, and the background environment;

step S2: obtaining a state set and a probability distribution of each traffic information source through actual observation and calculation;

wherein in step S2, according to the traffic information sources obtained in step S1, obtaining the state set of each traffic information source through actual observation, and obtaining the probability distribution by calculation;

let S be a finite state set of an information source, let $S=\{X_1, X_2, X_3, \ldots, X_m\}$, let P be a probability distribution of the finite state set S, and a probability of a state $X_i$ is $P(X_i)$;

step S3: using an information theory to quantify the traffic information sources, wherein specific steps are as follows:

step S31: calculating an amount of information of a single traffic information source, in the information theory, information is output by the traffic information source, and the traffic information source is U, let $U = f(S,P)$, let the amount of information of the traffic information source U in the state $X_i$ be $I_{X_i}$, $I_{X_i}$ is calculated as follows:

$I_U = I_{X_i} = -\log_2 P(X_i)$, an information entropy represents an uncertainty degree of the traffic information source, and the information entropy is represented by an overall average of an information amount of all possible states; the information entropy is positively correlated with the uncertainty degree of the traffic information source, the information entropy of the traffic information source is calculated as follows:

$$H(U) = -\sum_{i=1}^{m} P(Xi)\log_2 P(Xi),$$

when the probability of information sent by each state is equal, then:

$$H(U) = \sum_{i=1}^{m} P(Xi)\log_2\left(\frac{1}{p}\right) = Ixi$$

step S32: calculating an amount of information of a driving scene, the calculation formula is as follows:

$$I_n = \sum_{i=1}^{i=n} -\log_2 P(Xi),$$

wherein n is a number of traffic information sources for the driving scene;
the calculation formula of the information entropy of the driving scene is as follows:

$$B = -\sum_{i=1}^{i=n}\sum_{i=1}^{i=m} P(Xi)\log_2 P(Xi),$$

step S4: generating a quantized traffic scene representation based on the information entropy of the traffic information sources and the information entropy of the driving scene calculated in step S3, and transmitting the quantized traffic scene representation to a traffic information quantization system to adjust driving process in real-time.

* * * * *